United States Patent
Godon et al.

(10) Patent No.: US 11,012,234 B2
(45) Date of Patent: May 18, 2021

(54) UNIQUE IDENTIFIER MODULE, A SYSTEM FOR PROVIDING WITH A UNIQUE IDENTIFICATION, A RELATED MODULE AND RELATED METHOD

(71) Applicant: Alcatel Lucent, Nozay (FR)

(72) Inventors: Marc Godon, Antwerp (BE); Maarten Tytgat, Murray Hill, NJ (US); Werner Liekens, Antwerp (BE); Jourik De Loof, Antwerp (BE)

(73) Assignee: Alcatel Lucent, Nozay (FR)

( * ) Notice: Subject to any disclaimer, the term of this patent is extended or adjusted under 35 U.S.C. 154(b) by 228 days.

(21) Appl. No.: 15/774,758

(22) PCT Filed: Nov. 7, 2016

(86) PCT No.: PCT/EP2016/076818
§ 371 (c)(1),
(2) Date: May 9, 2018

(87) PCT Pub. No.: WO2017/080947
PCT Pub. Date: May 18, 2017

(65) Prior Publication Data
US 2018/0331827 A1 Nov. 15, 2018

(30) Foreign Application Priority Data
Nov. 10, 2015 (EP) .................... 15306786

(51) Int. Cl.
*H04L 9/32* (2006.01)
*H04L 9/08* (2006.01)
*G09C 1/00* (2006.01)

(52) U.S. Cl.
CPC ............. *H04L 9/0866* (2013.01); *G09C 1/00* (2013.01); *H04L 9/3278* (2013.01); *H04L 2209/805* (2013.01)

(58) Field of Classification Search
CPC .................................................. H04L 9/0866
See application file for complete search history.

(56) References Cited

U.S. PATENT DOCUMENTS 10,031,208 B2 * 7/2018 Lilly ..................... G01S 13/767
2012/0313483 A1 * 12/2012 Matsuda ............ H03H 9/02866
310/313 C (Continued)

FOREIGN PATENT DOCUMENTS

| JP | 2002-029184 | 1/2002 |
|----|-------------|--------|
| JP | 2003-256785 | 9/2003 |
| WO | WO 2009/156904 A1 | 12/2009 |

OTHER PUBLICATIONS

Ulrich Ruhrmair et al., "Security based on Physical Unclonability and Disorder," Introduction to Hardware security and Trust, 46 pages, XP055158364, 2012.

(Continued)

*Primary Examiner* — Josnel Jeudy
(74) *Attorney, Agent, or Firm* — Fay Sharpe LLP

(57) ABSTRACT

The present invention relates to a method, system and related devices for providing with a unique identification at excitation or reading of said unique identification. The system comprises a signal generator that is configured to generate a signal for feeding into said constellation of randomly distributed dielectric wave guide filaments and a unique identifier module that comprises a constellation of randomly distributed dielectric wave guide filaments being configured to generate a unique response signal at an output of said constellation of randomly distributed dielectric wave guide filaments at excitation of said constellation of randomly distributed) dielectric wave guide filaments by feeding a signal at an input of said constellation of randomly distributed dielectric wave guide filaments and a signal measurement means that is configured to measure the unique response signal at said output of said constellation of randomly distributed dielectric wave guide filaments and additionally a digital identification generation means that is configured to generate a unique digital identifier based on said unique response signal measured in combination with said predetermined input signal.

12 Claims, 3 Drawing Sheets

(56) References Cited

U.S. PATENT DOCUMENTS

| 2014/0252538 | A1* | 9/2014 | Bao | H01L 23/345 |
| | | | | 257/529 |
| 2016/0360533 | A1* | 12/2016 | Bennett | H04B 7/022 |
| 2017/0013455 | A1* | 1/2017 | Muller | H04W 12/02 |
| 2018/0175630 | A1* | 6/2018 | Lilly | H02J 5/005 |
| 2018/0331827 | A1* | 11/2018 | Godon | G09C 1/00 |

OTHER PUBLICATIONS

Yuqun Chen et al., "Certifying Authenticity via Fiber-Infused Paper," ACM SIGecom Exchanges, vol. 5, No. 3, pp. 29-37, XP040547660, Apr. 2005.

Harsha Umesh Babu, Reflective-Physically Uncloable Function based System for Anti-Counterfeiting, pp. 1-151, XP055148163, Dec. 10, 2013.

Taras Holotyak et al, "Fast identification of highly distorted images," Media forensics and Security II, SPIE, Vo. 7541, pp. 754116-1-754116-8, 2010.

International Search Report for PCT/EP2016/076818 dated Feb. 2, 2017.

* cited by examiner

UNIQUE IDENTIFIER MODULE, A SYSTEM FOR PROVIDING WITH A UNIQUE IDENTIFICATION, A RELATED MODULE AND RELATED METHOD

FIELD OF THE INVENTION

The present invention relates to the field of unique identifiers for uniquely identifying services objects, persons animals etc.

TECHNICAL BACKGROUND OF THE INVENTION

It is often desirable to uniquely label or identify items, such as large or small objects, plants, animals, people and or services for sorting, tracking, identification, verification, authentication, or for other purposes.

Currently, such unique identification may be applied by means of printed bar codes, QR codes, electronic microchips/transponders, near field communications based tags such as radio-frequency identification (RFID) tags, and fluorescence (or other optical techniques), which often are inadequate.

Such Near Field Communication based tags (NFC) use metal antennas e.g. copper to receive signals.

The barcodes or Quick response (QR) codes are printed visually, easy to
reproduce but expensive to read.

Furthermore, the Circuits printed with conductive inks are complex to make but still not difficult to copy and reproduce.

For example, these existing technologies may additionally be too large for certain applications, may not provide sufficient different codes, cannot be made flexible or bendable and/or cannot withstand harsh environments, e.g., harsh temperature, pressure, chemical, nuclear and/or electromagnetic environments.

It is a problem how to provide with a unique identifier that provides with a unique identification can be read in an easy and reliable manner and additionally can be produced in simple and cheap manner not easily being subject to counterfeiting.

SUMMARY OF THE INVENTION

An objective of the present invention is to provide with a method, a system and related devices for providing with a unique identifier but wherein the aforementioned shortcoming or drawbacks of the known solutions are alleviated or overcome.

Accordingly, embodiments of the present invention relate to a unique identifier module for providing with a unique identification at excitation or reading of said unique identification, wherein said Unique identifier module comprises a constellation of randomly distributed dielectric wave guide filaments, configured to generate a unique response signal at an output of said constellation of randomly distributed dielectric wave guide filaments at excitation of said constellation of randomly distributed dielectric wave guide filaments by feeding a signal at an input of said constellation of randomly distributed dielectric wave guide filaments.

Correspondingly, embodiments of the invention relate to a system for providing with a unique identification at excitation or reading of said unique identification, said system comprising a signal generator that is configured to generate a signal for feeding into said constellation of randomly distributed dielectric wave guide filaments and a unique identifier module according to claim 1, a signal measurement means that is configured to measure said unique response signal at said output of said constellation of randomly distributed dielectric wave guide filaments and a digital identification generation means, that is configured to generate a unique digital identifier based on said unique response signal and the predetermined input signal.

Accordingly, in an embodiment of the present invention a constellation of randomly distributed dielectric wave guide filaments, is configured to generate a unique response signal at an output of this constellation of randomly distributed dielectric wave guide filaments at excitation of the constellation of randomly distributed dielectric wave guide filaments by feeding a signal at an input of this constellation of randomly distributed dielectric wave guide filaments.

Accordingly, in an embodiment of the present invention a signal generator is configured to generate a predetermined signal for feeding into a constellation of randomly distributed dielectric wave guide filaments and in response to feeding this generated predetermined signal into the constellation of randomly distributed dielectric wave guide filaments, the meant constellation of randomly distributed dielectric wave guide filaments generates a unique response signal at an output of this constellation of randomly distributed dielectric wave guide filaments which unique response signal at an output of the constellation of randomly distributed dielectric wave guide filaments is measured by a measurement means where after the digital identification generation means generates a unique digital identifier based on said unique response signal and said predetermined input signal.

Due to the uniqueness of the constellation of dielectric wave guide filaments as a consequence of the randomness of distribution of dielectric wave guide filaments, a unique response signal is derived by feeding a predetermined input signal to an input of such unique constellation of dielectric wave guide filaments.

Such filaments may be thread-like structures composed of recyclable or non-recyclable plastics such as polyethylene terephthalate (PET), high-density polyethylene (HDPE) etc.

Furthermore, such a constellation of randomly distributed dielectric wave guide filaments may be produced by means of 3D printing extrusion, molding, etc. The waveguide material must have a different refractive index or dielectric constant from its surrounding material, which may be air or a foamed dielectric such as Styrofoam, as the guiding of electromagnetic waves in dielectric waveguides is caused by the difference in dielectric constant between the waveguide and its surroundings. This difference in dielectric constant gives rise to the necessary boundary conditions for the electromagnetic wave in order for it to propagate in the desired direction. Due to the randomness of the distribution of the dielectric wave guide filaments of the constellation, random phase delays and amplitude changes of the response signal will occur at excitation with the predetermined excitation-signal being the input signal.

These random phase delays and amplitude changes depend on the physical structure of the constellation of randomly distributed dielectric wave guide filaments. The construction is cheap and recyclable due to the potential use of recyclable plastics.

Such randomly distributed dielectric wave guide filaments may be constituted using recyclable plastics such as polyethylene terephthalate (PET), high-density polyethylene (HDPE), polystyrene (PS) or alternatively by means of PTFE Polytetrafluoroethylene being non recyclable.

Such an input signal may be a radio signal like a millimeter wave, as millimeter waves are well suited due to the fact that their wavelengths are only several millimeters. Therefore, the associated waveguide dimensions are also in the order of millimeters being small enough to provide with a compact waveguide network.

The use of radio waves allows to easily measure both amplitude and phase of the signal.

The applied radio waves preferably are of very high frequency, such that the waveguides can become small in size. The related electronics circuits hence are cheap to produce.

Such constellation of unique constellation of dielectric wave guide filaments may be obtained from Dielectric wave guide filaments that are randomly distributed, in one or several layers, optionally on top of a wave insulating substrate.

Accordingly, the construction of such unique constellation of dielectric wave guide filaments when produced using of recyclable plastics is relatively inexpensive and recyclable. Moreover, the use of radio waves allows to easily measure both amplitude and phase of the signal.

Accordingly, embodiments of the present invention relate to a Unique identifier module further comprising an insulating substrate configured to carry said constellation of randomly distributed dielectric wave guide filaments.

Accordingly, embodiments of the present invention further relate to a system wherein said unique identifier module further comprises an insulating substrate configured to carry said constellation of randomly distributed dielectric wave guide filaments.

An additional embodiment of the present invention relates to Unique identifier device wherein said Unique identifier device further comprises an insulating substrate configured to carry said network of randomly distributed dielectric wave guide filaments.

Such insulating substrate is configured to carry said constellation of randomly distributed dielectric wave guide filaments may be constituted by means of Styrofoam or other polymer foams. Alternatively, metal suspension structures can be used. The contact area with the waveguide must be minimized in order to prevent signal loss.

Accordingly, embodiments of the present invention relate to a system wherein said digital identification generation means, is configured to generate a unique digital identifier based on said unique response signal in combination with the predetermined input signal by determining the transfer function or frequency response of said constellation of randomly distributed dielectric wave guide filaments. Correspondingly, the digital identification generation means generates a unique digital identifier based on the unique response signal and said predetermined input signal by determining the transfer function or frequency response of this constellation of randomly distributed dielectric wave guide filaments.

The applied measurement circuit may comprise a wave generator and a wave spectrum analyzer. A response of the waveguide network to the specific input signal is measured. The measured characteristics are encoded into a digital identifier, optionally being a binary identifier.

Further characterizing embodiments of the present method for providing with a unique identification are mentioned in the appended claims.

The effects and advantages of the apparatus and systems according to embodiments of the present invention are substantially the same, mutatis mutandis, as those of the corresponding methods according to embodiments of the present inventions.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

Figure 1:
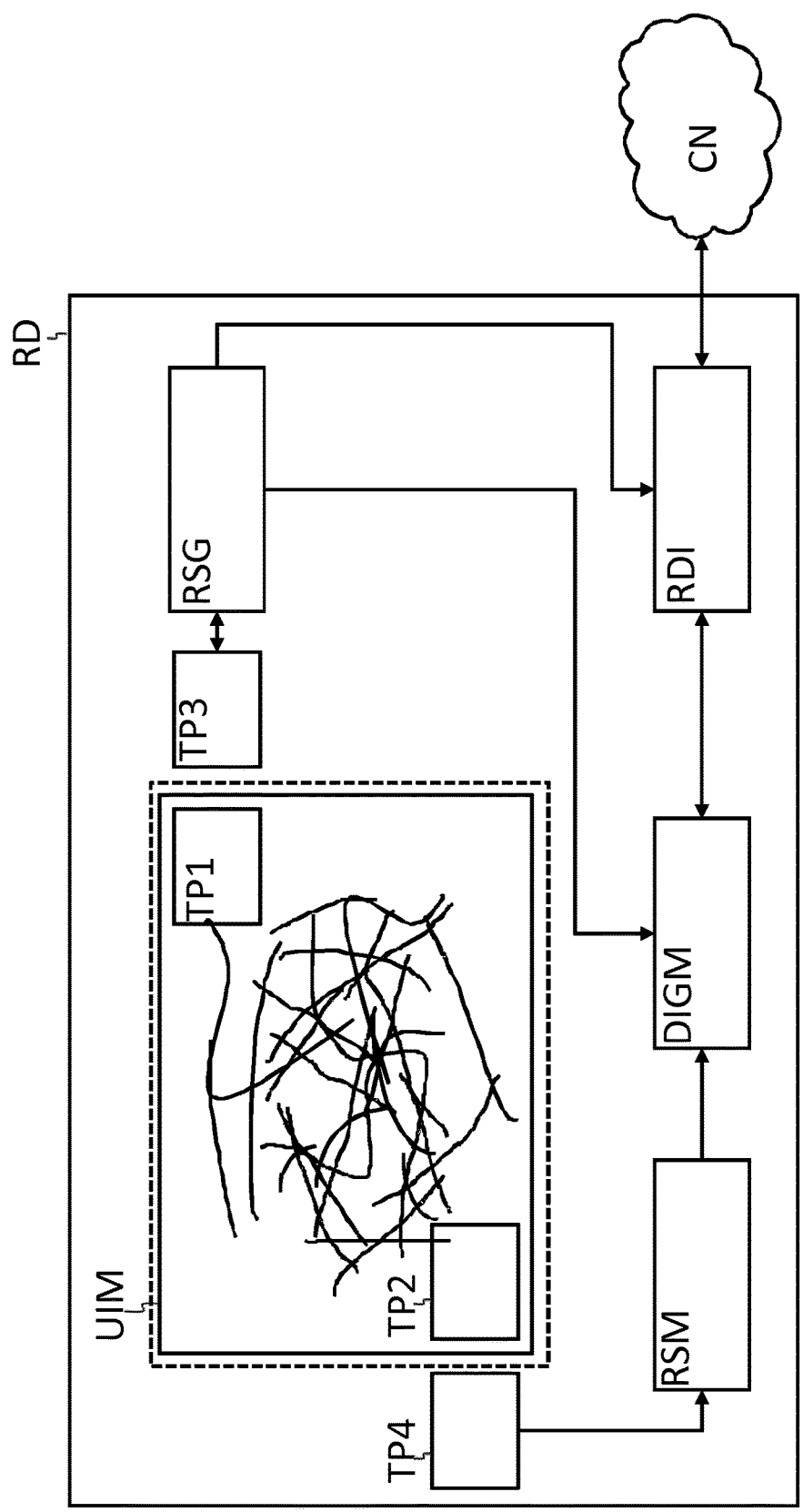
FIG. 1 represents a functional representation of a system for providing with a unique identification at excitation or reading of said unique digital identification.

In the following paragraphs, referring to the drawing in FIG. 1, an implementation of the system for providing with a unique identification at excitation or reading of said unique identification according to an embodiment of the present invention is described. In the second paragraph, all connections between mentioned elements are defined. Subsequently all relevant functional means of the mentioned system as presented in FIG. 1 are described followed by a description of all interconnections.

In the succeeding paragraph the actual execution of the system is described.

A first essential element of the system is a Unique identifier module UIM for providing with a unique identification at excitation or reading of said unique identification and a second essential element of the system is a Unique identifier Reader device RD for determining a unique digital identifier corresponding to the Unique identifier module UIM.

Such Unique identifier module UIM according to an embodiment of the present invention comprises a constellation of randomly distributed dielectric wave guide filaments, which are configured to generate a unique response signal at an output of said constellation of randomly distributed dielectric wave guide filaments at excitation of said constellation of randomly distributed dielectric wave guide filaments by feeding a signal at an input of said constellation of randomly distributed dielectric wave guide filaments.

The unique identifier module UIM further may comprise an insulating substrate that is configured to carry the constellation of randomly distributed dielectric wave guide filaments. The substrate for carrying the constellation may provide strength and stiffness to the constellation of randomly distributed dielectric wave guide filaments.

Such Unique identifier module UIM may additionally comprise a plurality of dielectric wave guide touch points TP1, TP2 respectively being the input and the output of the constellation of randomly distributed dielectric wave guide filaments, which hence are configured to couple the constellation of randomly distributed dielectric wave guide filaments to a respective output TP3 of a radio signal generator RSG and input TP4 of a radio signal measurement means RSM.

The Unique identifier Reader device RD may be coupled over a communications network optionally including a mobile—or fixed access networks in concatenation with the internet or other suitable networks to a identification server IS.

The Unique identifier Reader device RD in turn comprises a signal generator RSG that is configured to generate a signal for feeding into said constellation of randomly distributed dielectric wave guide filaments and a measurement means RSM which is configured to measure the unique response signal at the output of the constellation of randomly distributed dielectric wave guide filaments and furthermore a digital identification generation means DIGM, that is configured to generate a unique digital identifier based on said unique response signal.

The Unique identifier Reader device RD further is equipped with a plurality of dielectric wave guide touch points TP3, TP4 respectively being the output of the signal generating means RSG and the input of the signal measurement means RSM, which touch points hence are configured to couple the respective output TP3 of a radio signal generator RSG and input TP4 of a radio signal measurement means RSM to the respective input and output of the constellation of randomly distributed dielectric wave guide filaments. Such touch points are couplers, which have to couple the radio signal from the signal generator RSG to the waveguide and from the waveguide to the RSM. These couplers may be an antenna or some other electromagnetic wave coupling structure.

Further such Unique identifier Reader device RD may include a Unique identifier Reader device interface RDI that is configured to control the reading of the Unique identifier module UIM and which for instance may be configured to start and stop the measurement and optionally also may be configured to interface with external devices such as a Smartphone, Personal Computer, tablet or the cloud if the Unique identifier Reader device interface RDI is enabled with Internet Protocol capabilities.

The signal generator RSG is coupled with a first output to the Dielectric wave guide touch points TP3 and with a second output to an input of the digital identification generation means DIGM. Finally, the signal generator RSG is coupled to the unique identifier Reader device interface RDI.

Dielectric wave guide touch points TP4 is coupled with an output to an input of the signal measurement means RSM which in turn is coupled with an output to an input of the digital identification generation means DIGM. The digital identification generation means DIGM further is coupled to the Unique identifier Reader device interface RDI. The Unique identifier Reader device interface RDI further is coupled with an input/output to an input/output terminal of the Unique identifier Reader device RD.

In order to explain the present invention first it is assumed that there is a Unique identifier module UIM being incorporated in a poster, bank- or credit-card, cell phone, Smartphone, personal computer, etc, which Unique identifier module UIM comprises a constellation of randomly distributed dielectric wave guide filaments being produced using recyclable plastic such as polyethylene terephthalate (PET), high-density polyethylene (HDPE), polystyrene (PS) etc. Alternatively, the constellation of randomly distributed dielectric wave guide filaments may be produced based on any other kind of plastics.

Even a further alternative may be, where a constellation of randomly distributed dielectric wave guide filaments, in the case of a poster, may be applied on top of the paper surface of the poster, where the poster additional performs the task of carrier of the constellation of randomly distributed dielectric wave guide filaments.

The constellation of randomly distributed dielectric wave guide filaments is produced in such manner that it is configured to provide with a unique identification at excitation or reading of said unique identification. This identification may be applied for uniquely identifying a certain service like a Banking account/credit card account for making a payment or transfer of data between cellphones, authentication of phone or personal computer or other applications requiring a unique identification.

The unique identifier Reader device RD, at reading the Unique identifier module, generates by means of the signal generator RSG a signal for feeding into the constellation of randomly distributed dielectric wave guide filaments via respective touch points TP3 and TP1. Such signal input signal may be a signal whereof the frequency is swept over a certain range.

Alternatively, such an input signal may be chosen to be a simpler signal, for example a signal comprising one or more modulated continuous-wave signals or the input signal may be for example frequency chirps or short pulses or any other suitable input-signal.

The aim of the signal generator RSG and the measurement means RSM is to characterize the constellation of randomly distributed dielectric wave guide filaments based on a millimeter-wave (radio) signal in such a manner that the response is unique for each network, based on the underlying 2D or 3D structure of the plastic waveguides.

Subsequently, at feeding the input signal to the constellation of randomly distributed dielectric wave guide filaments, at the output of the constellation of randomly distributed dielectric wave guide filaments and consequently at touch point TP2, a unique response signal is induced which is transferred to the signal measurement means RSM via touch point TP4. The signal measurement means RSM measures this unique response signal at the output of the constellation of randomly distributed dielectric wave guide filaments and subsequently feeds the measured unique response signal into the identification generation means DIGM. The identification generation means DIGM in turn, generates a unique digital identifier based on said unique response signal measured and said predetermined input signal.

In order to generate such unique digital identifier, the identification generation means DIGM compares the signal that the radio signal generator RSG sends into the constellation of randomly distributed dielectric wave guide filaments with the signal being induced in the waveguide network.

At the input of the constellation of randomly distributed dielectric wave guide filaments, touch point TP1, a signal is applied whose frequency is swept over a certain range and the response of the network (amplitude and phase) is measured at each frequency.

The digital identification generation means DIGM may generate a unique digital identifier based on said unique response signal of the constellation of waveguides in combination with said predetermined input signal at the input of the constellation of waveguides by determining the transfer function or frequency response of said constellation of randomly distributed dielectric wave guide filaments. At each frequency, the output signal is compared to the input signal in terms of amplitude and phase, or equivalently, the complex frequency response of the constellation of randomly distributed dielectric wave guide filaments at millimeter wave frequencies may be determined. The determined frequency response may or may not be digitalized and/or coded in order to obtain a digital unique code.

The digital identification generation means DIGM subsequently outputs the determined unique digital identifier for being applied in an application such as a banking application where the unique digital identifier identifies a banking account of a person or in another application field, a advertisement campaign wherein the unique digital identifier identifies a campaign, a product offer reduction-coupons of a certain product provider. The unique digital identifier may be forwarded by means of the Unique identifier Reader device interface RDI that is configured to control the reading of the Unique identifier module UIM and which for instance may include start and stop of the measurement and optionally also may be configured to interface with external devices such as a personal computer, server, tablet, Smartphone or any other processing device.

Figure 2:
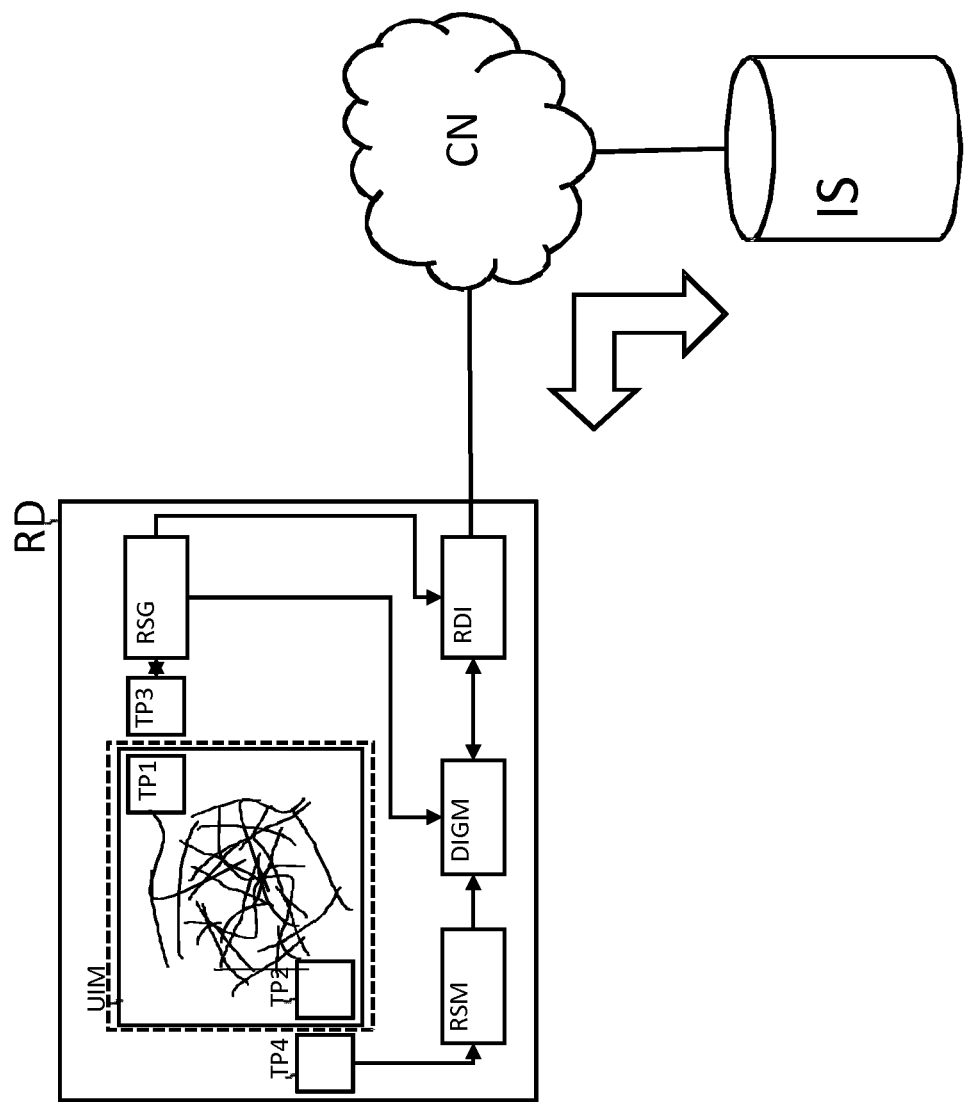
FIG. 2 represents the functional structure of a reader device RD and a card including a constellation of randomly distributed dielectric wave guide filaments according to an embodiment of the present invention.
Figure 3:
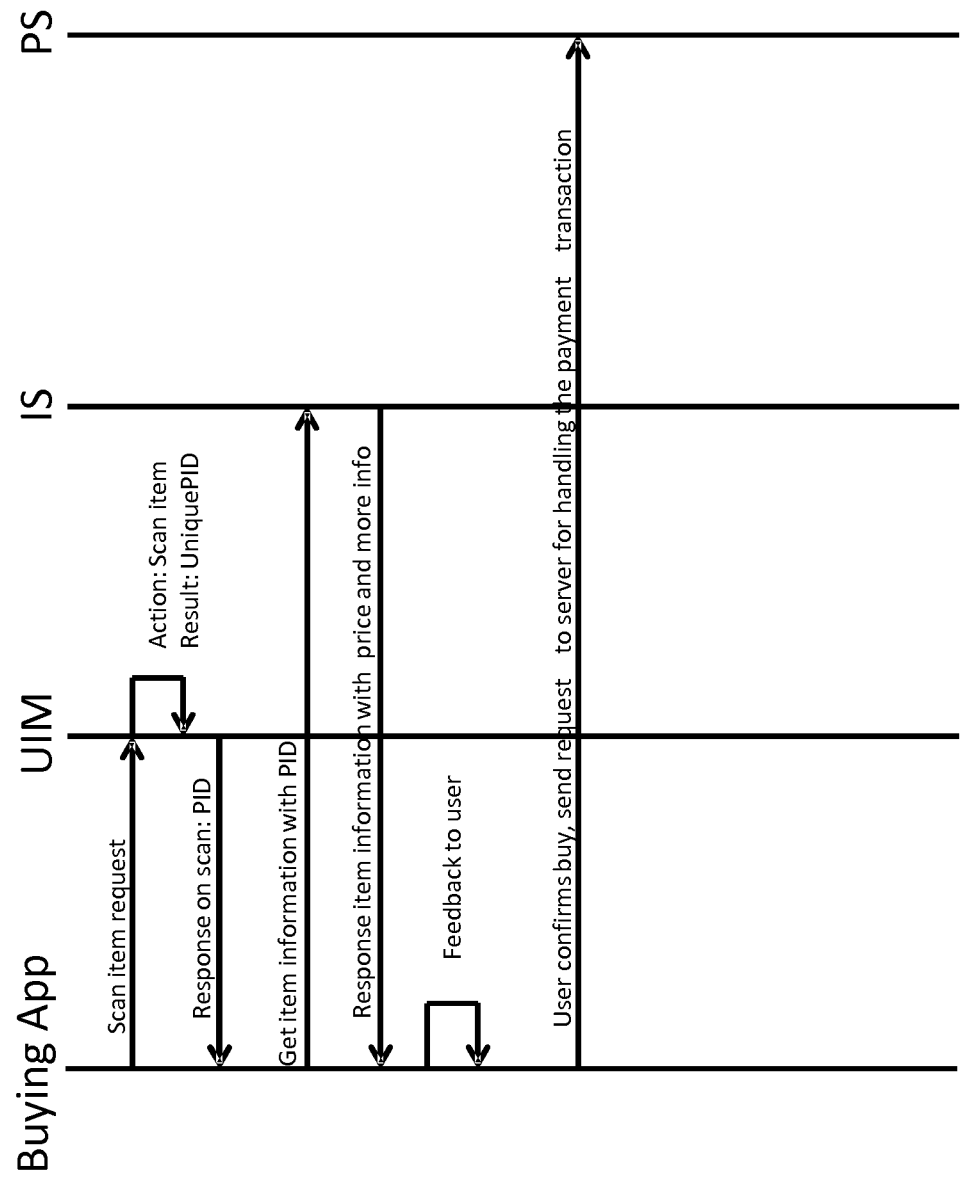
FIG. 3 shows a flow of an application making use of such unique digital identification.

Further in order to show an embodiment of an application of such a unique identifier module UIM a service as may be applied in an environment shown in FIG. 2 and FIG. 3 is described.

First it is assumed that the unique identifier module UIM is applied for a buying a certain product e.g. a television a computer or even groceries in a supermarket, while assuming that each product is tagged with a unique identifier module UIM of the present invention where the unique identifier module UIM may be incorporated in a certain attachable stuck to the target product.

Further, it is assumed that person having the intent to buy the product, e.g. the television uses his Smartphone having a buying—or payment application such as a banking application installed at his Smartphone and in addition a reader device RD incorporated in his Smartphone. The user starts his payment application or buying application which application triggers the incorporated reader device RD to read the unique identifier module UIM attached to the television. The reader device at excitation of the unique identifier module UIM obtains a unique code, in this embodiment, being the product ID, PID of the television. The product Id PID is received at the buying application and subsequently is communicated to the identification server IS which in turn responds the buying application with the product identification, price information and other relevant information concerning the intended television.

The identification server IS is configured to looks up the identification in a table of a data base comprising a table with a plurality of product ID PID where each product Identification PID is associated with product information on each corresponding product.

The buying application subsequently may present the obtained product information on the screen of the user's Smartphone. The Smartphone's user, upon may confirm the purchase of the television where after the buying application makes the payment via the usual way, i.e. via the payment server PS of the bank where the user has a banking-account.

Alternatively it is assumed that the unique identifier module UIM is applied for a banking Service where the unique identifier module UIM is incorporated in a banking-card of a certain person.

Further, it is assumed that at reading a unique identifier module UIM, here being a certain unique digital identification identifying a bank account of this person is obtained by the unique identifier Reader device RD. It is further assumed that at reading the unique identifier module UIM incorporated in the meant banking card, the unique digital identification identifying the meant bank account of this person is output by the unique identifier Reader device RD and propagated over the communications network CN to an identification server. The identification server based on the unique digital identification identifying the owner of the banking card with associated account information for communicating to the appropriate banking server of the meant bank.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

The invention claimed is:

1. An identifier module comprising:
   a constellation of randomly distributed dielectric wave guide filaments having an input and an output, whereby a random distribution of said randomly distributed dielectric wave guide filaments results in a configuration of the identifier module to generate a unique response signal at said output of said constellation of randomly distributed dielectric wave guide filaments in response to excitation of said constellation of randomly distributed dielectric wave guide filaments with a predetermined signal at said input of said constellation of randomly distributed dielectric wave guide filaments.

2. Said identifier module according to claim 1, wherein said identifier module further comprises:
an insulating substrate configured to carry said constellation of randomly distributed dielectric wave guide filaments.

3. A system comprising:
at least one processor; and
at least one memory including computer program code, the at least one memory and the computer program code configured to, with the at least one processor, cause the system to:
generate a predetermined signal for exciting a constellation of randomly distributed dielectric wave guide filaments;
measure a response signal at an output of said constellation of randomly distributed dielectric wave guide filaments;
generate a unique digital identifier based on said measured response signal and said predetermined input signal; and
the system further comprising:
an identifier module, wherein the identifier module comprises a corresponding constellation of randomly distributed dielectric wave guide filaments having an input and an output, whereby a random distribution of said randomly distributed dielectric wave guide filaments results in a configuration of the identifier module to generate a unique response signal at the output of the corresponding constellation of randomly distributed dielectric wave guide filaments in response to excitation of the corresponding constellation of randomly distributed dielectric wave guide filaments with a predetermined signal at the input of said corresponding constellation of randomly distributed dielectric wave guide filaments.

4. The system according to claim 3, wherein said wherein said identifier module further comprises:
an insulating substrate configured to carry said constellation of randomly distributed dielectric wave guide filaments.

5. The system according to claim 3, wherein said system is configured, with said at least one memory, computer program code and at least one processor, to generate said unique digital identifier based on said measured response signal and said predetermined input signal by determining a transfer function of said constellation of randomly distributed dielectric wave guide filaments.

6. An identifier reader device, said identifier reader device comprising:
at least one processor; and
at least one memory including computer program code, the at least one memory and the computer program code configured to, with the at least one processor, cause the identifier reader device to:
generate a predetermined signal for feeding into a constellation of randomly distributed dielectric wave guide filaments;
measure said unique response signal at said output of said constellation of randomly distributed dielectric wave guide filaments; and
generate a unique digital identifier based on said measured response signal and said known input signal.

7. A method comprising:
delivering a predetermined signal into an input of a constellation of randomly distributed dielectric wave guide filaments;
measuring a response signal at an output of said constellation of randomly distributed dielectric wave guide filaments; and
generating a digital identifier based on said response signal and said predetermined input signal.

8. The method according to claim 7, wherein delivering a predetermined signal into an input of a constellation of randomly distributed dielectric wave guide filaments comprises delivering a predetermined signal into an input of a constellation of randomly distributed dielectric wave guide filaments carried on an insulating substrate filaments.

9. The method according to claim 7, wherein generating said digital identifier based on said response signal and said predetermined input comprises determining a transfer function of said constellation of randomly distributed dielectric wave guide filaments.

10. Said identifier module of claim 1 further comprising an article or device to be identified by association with the unique identifier module.

11. An identifier reader device, said identifier reader device comprising:
at least one processor; and
at least one memory including computer program code, the at least one memory and the computer program code configured to, with the at least one processor, cause the identification reader to:
generate a predetermined signal for feeding into an associated constellation of randomly distributed dielectric wave guide filaments, the associated constellation of randomly distributed dielectric wave guide filaments having an input and an output, whereby a random distribution of said randomly distributed dielectric wave guide filaments results in a configuration to generate a unique response signal at said output of said constellation of randomly distributed dielectric wave guide filaments in response to excitation of said constellation of randomly distributed dielectric wave guide filaments with said predetermined signal at said input of said constellation of randomly distributed dielectric wave guide filaments;
measure said unique response signal at said output of said associated constellation of randomly distributed dielectric wave guide filaments; and
generate a digital identifier based on said measured response signal and said known input signal.

12. A method comprising:
delivering a predetermined signal into an input of a constellation of randomly distributed dielectric wave guide filaments, the constellation of randomly distributed dielectric wave guide filaments having the input and an output, whereby a random distribution of said randomly distributed dielectric wave guide filaments results in a configuration to generate a unique response signal at said output of said constellation of randomly distributed dielectric wave guide filaments in response to excitation of said constellation of randomly distributed dielectric wave guide filaments with said predetermined signal at said input of said constellation of randomly distributed dielectric wave guide filaments;
measuring a response signal at an output of said constellation of randomly distributed dielectric wave guide filaments; and
generating a digital identifier based on said response signal and said predetermined input signal.

* * * * *